J. D. STODDARD.
FENCE MACHINE.
APPLICATION FILED DEC. 26, 1905.

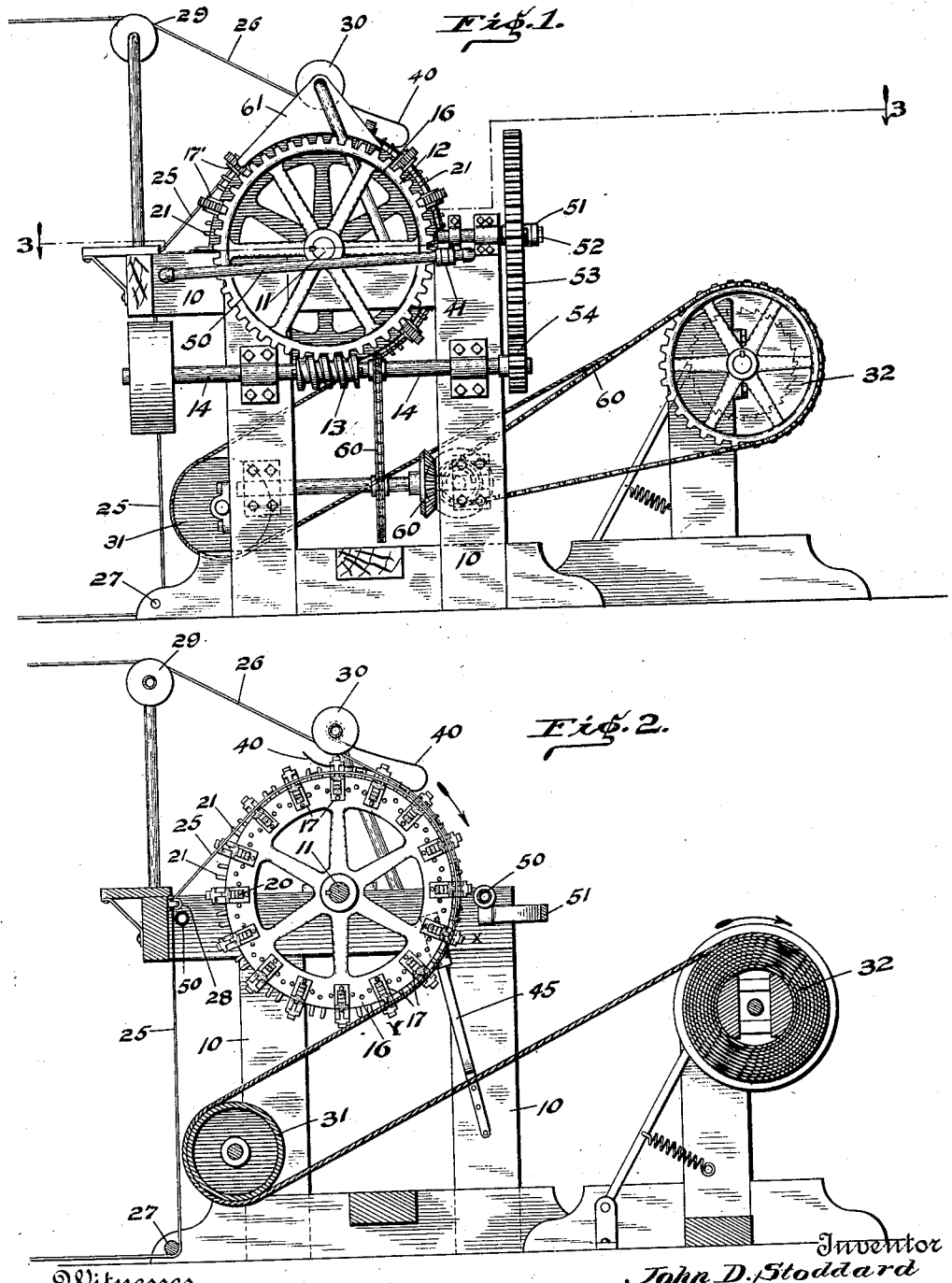

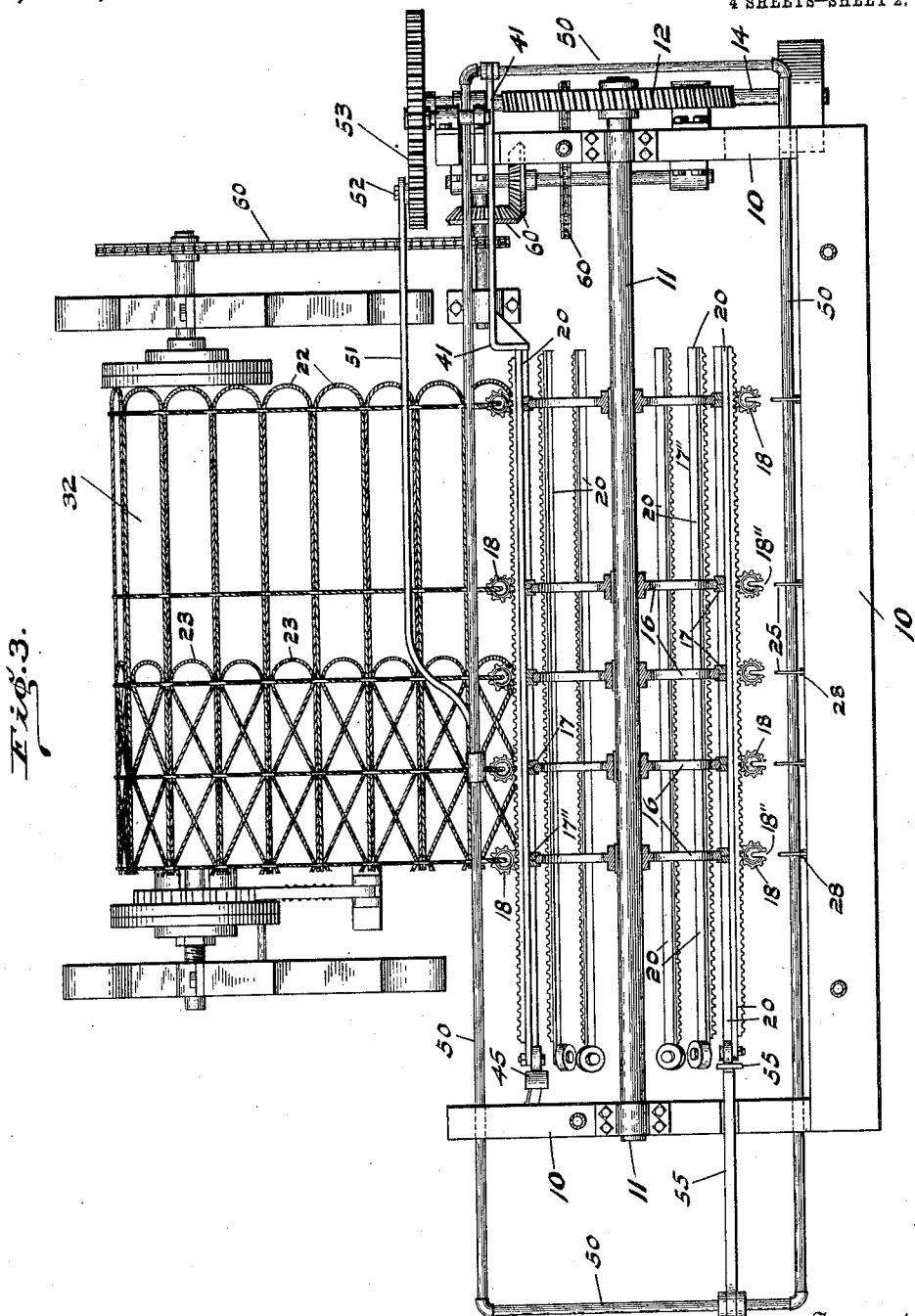

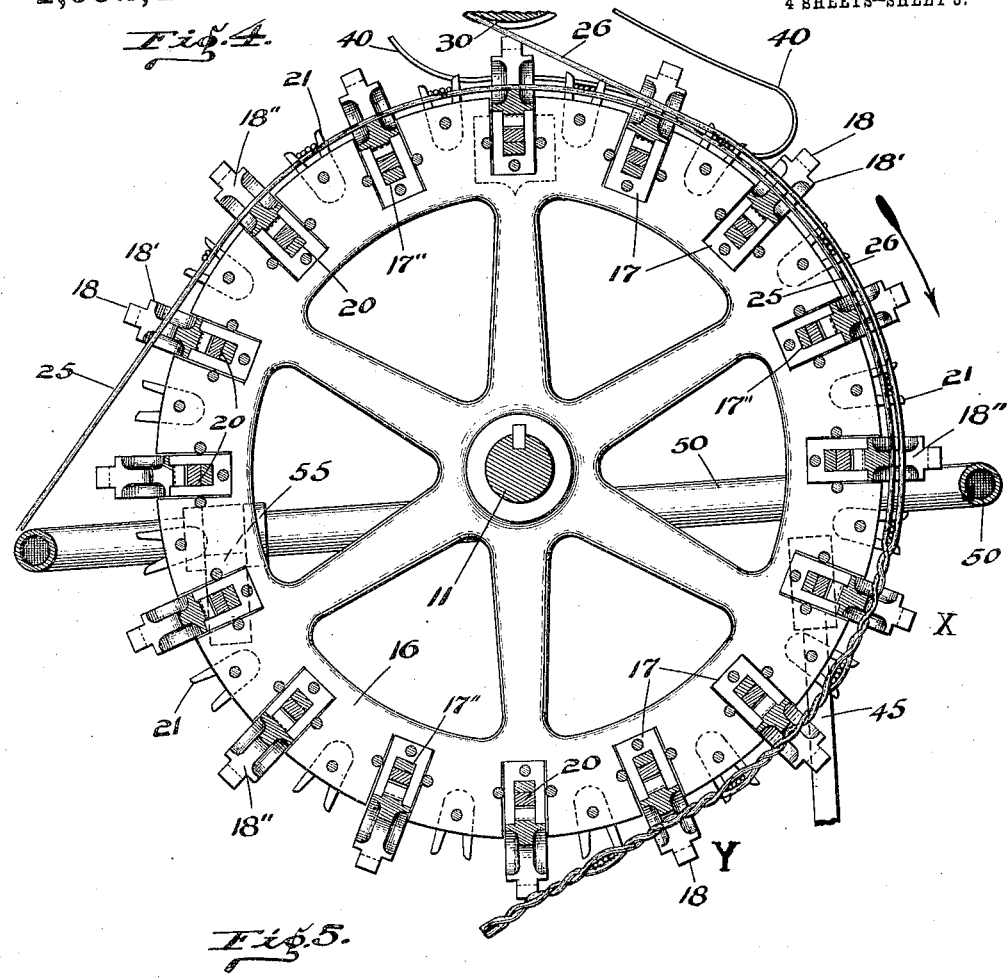
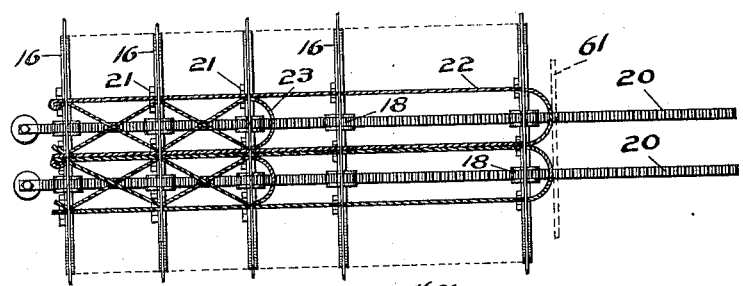

1,092,409.

Patented Apr. 7, 1914.
4 SHEETS—SHEET 4.

Witnesses
Frank A. Fahl
Ruth B. Worthington

Inventor
John D. Stoddard
By Bradford A. Hood
Attorneys

UNITED STATES PATENT OFFICE.

JOHN D. STODDARD, OF CAMBRIDGE CITY, INDIANA, ASSIGNOR, BY MESNE ASSIGNMENTS, TO INTERLOCKING FENCE COMPANY, OF MORTON, ILLINOIS, A CORPORATION OF ILLINOIS.

FENCE-MACHINE.

1,092,409.     Specification of Letters Patent.     Patented Apr. 7, 1914.

Application filed December 26, 1905. Serial No. 293,188.

*To all whom it may concern:*

Be it known that I, JOHN D. STODDARD, a citizen of the United States, residing at Cambridge City, in the county of Wayne and State of Indiana, have invented certain new and useful Improvements in Fence-Machines, of which the following is a specification.

The object of my invention is to produce a power driven machine capable of making that type of wire fence which consists of several pairs of running wires, the wires of each pair twisted together at an intermediate point between the two pickets oppositely toward the pickets.

Figure 10:
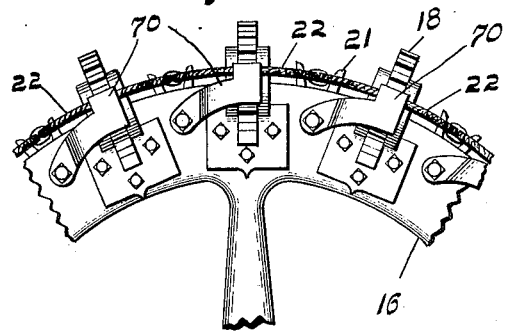
Figure 11:
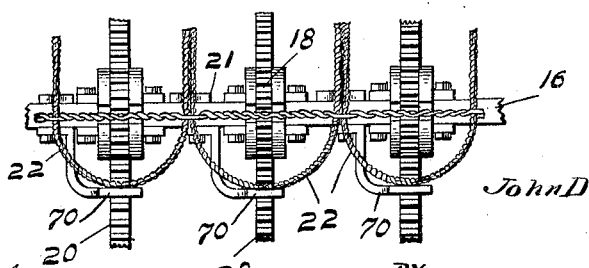

The accompanying drawings illustrate my invention:

Figure 1 is a side elevation of a machine embodying the invention; Fig. 2 a transverse vertical section in one of the twisting planes; Fig. 3 a horizontal section on line 3—3 of Fig. 1; Fig. 4 an enlarged vertical sectional detail of the forming drum; Fig. 5 a plan of that portion of the forming drum at the point of twisting; Fig. 6 a sectional detail of one of the twisting mechanisms on line 6—6 of Fig. 7; Fig. 7 a sectional detail of the same parts on line 7—7 of Fig. 6; and Figs. 8 and 9 details of different styles of fence which can be made with my machine; Fig. 10 is a side elevation of a part of one of the heads 16 with a modified form of gage plate for determining the proper positioning of the pickets, and Fig. 11 is a plan thereof.

In the drawings 10 indicates a suitable supporting frame in which is journaled a horizontal shaft 11 carrying at one end a worm wheel 12 driven by a worm 13 on the main drive shaft 14 which is also journaled on the main frame.

Keyed upon the shaft 11, and adjustable longitudinally thereon, are several wheels or heads 16 each of which is notched in its periphery in order to receive a plurality of twister-gear-brackets 17 which are bolted firmly to the head as clearly shown in Figs. 4, 6 and 7. Each of the twister-gear-brackets 17 consists of a pair of mating members each having a pair of fingers 17' adapted to embrace the hub 18' of a twister-gear 18, in a well-known manner. Each of said twister gears is provided with external gear teeth and has formed therein a radial wire-receiving slot 18'' into which are introduced the two wires to be twisted together. Brackets 17 are provided, immediately beneath the twister gear, with a notch 17''. The twister gears of the several heads are regularly arranged angularly about the head and the heads are similarly placed upon the shaft so that the twister gears of the several heads will be in axial alinement. The several gears of each axial series or sets are connected by a rack-bar 20 slidably mounted in the alined notches 17'', the arrangement being such that, by shifting the rack-bar axially the twister gears geared therewith will be rotated simultaneously, in one direction or the other.

Arranged between each circumferential two twister-gears is means for retaining and properly spacing the transverse pickets which are to be associated with the running wires (hereafter mentioned). In the drawings I show this retaining means as a crotch bracket 21 attached to the periphery of the head 16 between each two twister gears, said crotch bracket being adapted to receive the transverse pickets. In the drawings I have shown the transverse pickets as consisting of U-shaped portions 22 the legs of which straddle a longitudinal set of twister gears; and some shorter cross-wire pickets 23 which are nested between the lower ends of the legs of each U-shaped picket.

The fence is to be formed of pairs of running wires 25 and 26 and the pickets placed between the two sets of running wires. The lower running wire 25 of each pair is drawn from any suitable supply and passes upward around an idler 27 and thence over an idler 28 and around the twister drum, lying in the radial slots 18'' of a circumferential set of twister gears. The upper running wire 26 of each pair goes from a point above the machine over an idler 29 and thence beneath an idler 30 and into the radial slots 18'' of a circumferential set of twister gears, on top of the corresponding running wire 25. The pairs of running wires pass from the under side of the twister drum around an idler 31 and thence to the fabric reel 32 which may be of any desired form. The twister drum or frame (composed of shaft 11, heads 16, twister gears 18 and racks 20) may be advanced intermittently step-by-step or rotated continuously, and in the drawings I show, as has already been explained, means for causing continuous advance of the drum, as I believe this to be preferable. As the drum advances the running wires are drawn forward with and over the drum and the transverse pickets, of any desired form, are laid in the retainers 21, passing under spring fingers 40 which serve to hold them in place until they are engaged by the upper set of running wires 26. When an axial set of twister gears has reached approximately the point "X" (see Fig. 4) the corresponding rack bar 20 is engaged by a pusher 41 and pushed endwise through the twister-gear-brackets, thus rotating the connected twister gears so as to twist the pairs of running wires lying in the radial slots of said twister gears together in opposite directions beginning at a point half way between two adjacent transverse pickets, in a manner well understood in the art. The twisting movement of the twister wheels is such as to carry the radial slots somewhat beyond the opening between the two sets of embracing fingers 17 in order to compensate for the elasticity of the twisted running wires; and in order to make sure that the twister gears will stand so that the open ends of the radial slots 18" will lie adjacent the space between said embracing fingers, I provide a spring arm 45 which engages the projected rack bars 20 as they advance and partially returns them, thus permitting the fabric to be withdrawn from the twister gears at the point "Y".

The pusher 41 is carried by a frame 50 which is movable on the main frame parallel with the axis of the shaft 11 and is reciprocated in proper time by any suitable means, such, for instance, as the pitman 51 which is pivoted at one end to the frame 50 and at the other end to a wrist pin 52 carried by a gear 53 meshing with a pinion 54 carried by the main drive shaft 14. At the end of frame 50 opposite the end to which the pusher 41 is attached, is a second pusher 55 which is arranged to engage the rack bars 20, after the fabric has been withdrawn from the twister gears, and return said rack bars to their normal position where they may be again engaged, in due turn, by the pusher 41. The fabric reel 32 may be driven by any suitable means as, for instance, the train of gearing 60 which connects it with the main drive shaft 14.

Figure 8:
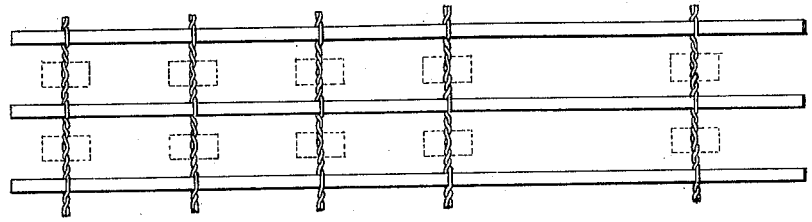
Figure 9:
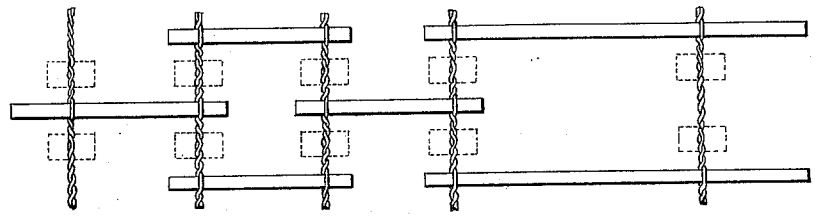

It will be readily understood that ordinary slat pickets as shown in Fig. 8 may be used instead of the peculiar pickets shown in Fig. 5, or a square mesh fence may be made by using the form of wire picket shown in Fig. 9, without departing from my invention. In order to hold the pickets in proper transverse alinement any desired means may be used, for instance, I arrange, adjacent one end head 16, a gage plate 61 against which the ends of the pickets may abut. The size of fence and distance between the running wires may be varied by merely adjusting the heads 16 longitudinally on the shaft 11. In place of the single stationary gage plate 61, the outer head 16 may be provided with a series of gage fingers 70 against which the ends of the pickets may be abutted.

I claim as my invention:

1. In a fence machine, in combination, a continuously revolved frame, a plurality of rows of twisters on said frame, longitudinally movable rack-bars in mesh with said twisters, a longitudinally movable pusher for shoving the rack-bars in one direction, a second longitudinally movable pusher for shoving the rack-bars in an opposite direction, a frame common to both pushers, and means for alternately moving said pusher frame in opposite directions.

2. In a fence machine, in combination, a continuously revolved frame, a plurality of rows of twisters on said frame, longitudinally movable rack-bars in mesh with said twisters, a longitudinally movable pusher for shoving the rack-bars in one direction, a second longitudinally movable pusher for shoving the rack-bars in an opposite direction, a frame common to both pushers, means for alternately moving said pusher frame in opposite directions, and retractable means for the rack-bars, with which said rack-bars engage during the alternate operations of the pusher frame.

3. In a fence machine, in combination, a shaft, a frame revoluble with said shaft, means for operating the shaft, a plurality of rows of twisters on said frame, rack-bars in mesh with the twisters and movable axially of the shaft, a frame also movable axially of said shaft, means on the last-mentioned frame for moving the rack-bars in one direction and means also on said frame for moving the rack-bars in an opposite direction, and means for moving said axially movable frame.

4. In a fence machine, in combination, a shaft, a frame revoluble with said shaft, worm gearing for operating said shaft, a plurality of rows of twisters on said frame, rack-bars in mesh with the twisters and movable axially of the shaft, a frame also movable axially of said shaft, a pair of pushers on said last-mentioned frame, one of said pushers adapted to successively engage the rack-bars to move them in one direction and the other pusher operating alternately with said first-mentioned pusher to move the rack-bars in an opposite direction, a revoluble member for operating the pusher frame, and a pitman bar connected with said pusher frame and with said revoluble member.

In witness whereof, I have hereunto set my hand and seal at Cambridge City, Indiana, this 19th day of December, A. D. one thousand nine hundred and five.

JOHN D. STODDARD. [L. S.]

Witnesses:
 JOHN C. DODSON,
 SANTFORD WILSON.

Copies of this patent may be obtained for five cents each, by addressing the "Commissioner of Patents, Washington, D. C."